(12) United States Patent
Foelster et al.

(10) Patent No.: US 7,178,873 B2
(45) Date of Patent: Feb. 20, 2007

(54) MOTOR VEHICLE SEAT

(75) Inventors: Thomas Foelster, Grafenau (DE); Thomas Heckmann, Aidlingen (DE)

(73) Assignee: DaimlerChrysler AG, Stuttgart (DE)

( * ) Notice: Subject to any disclaimer, the term of this patent is extended or adjusted under 35 U.S.C. 154(b) by 400 days.

(21) Appl. No.: 10/888,511

(22) Filed: Jul. 12, 2004

(65) Prior Publication Data
US 2005/0046251 A1    Mar. 3, 2005

(30) Foreign Application Priority Data
Jul. 12, 2003    (DE) ................ 103 31 611

(51) Int. Cl.
*B60N 2/28* (2006.01)
(52) U.S. Cl. ......................................... 297/253
(58) Field of Classification Search ................ 297/253, 297/250.1, 463.1
See application file for complete search history.

(56) References Cited

U.S. PATENT DOCUMENTS

| 5,918,934 | A  | * | 7/1999  | Siegrist ............... 297/250.1 |
| 5,941,601 | A  | * | 8/1999  | Scott et al. .............. 297/253 |
| 6,030,046 | A  |   | 2/2000  | Dorow |
| 6,082,818 | A  | * | 7/2000  | Muller ................. 297/250.1 |
| 6,196,628 | B1 | * | 3/2001  | Goy et al. ............... 297/253 |
| 6,547,329 | B2 | * | 4/2003  | Deptolla ................. 297/253 |
| 6,631,958 | B1 | * | 10/2003 | Herrmann et al. ........ 297/463.1 |
| 2002/0008416 | A1 | | 1/2002 | Deptolla |

FOREIGN PATENT DOCUMENTS

| DE | 19650087 C1 | 12/1997 |
| DE | 10128670    | 6/2002 |
| DE | 10160236 C1 | 11/2002 |
| EP | 0987141 A2  | 3/2000 |

OTHER PUBLICATIONS

German Office Action dated Jul. 21, 2004 with English translation.

* cited by examiner

*Primary Examiner*—Peter R. Brown
(74) *Attorney, Agent, or Firm*—Crowell & Moring LLP

(57) ABSTRACT

A motor vehicle seat with a seat cushion and a backrest has a fixing bracket for a child's seat placed on the seat cushion. The fixing bracket can be swiveled out of a covered out-of-use position into a functioning position arranged between a seat cushion and a backrest through a swiveling device. In order to attain a secure mounting of the child's seat and at the same time require the least amount of space possible, the fixing bracket can be swiveled into the functioning position or back into the out-of-use position through a swiveling device that has a four arm linkage.

29 Claims, 4 Drawing Sheets

MOTOR VEHICLE SEAT

This application claims the priority of German application 103 31 611.6, filed Jul. 12, 2003, the disclosure of which is expressly incorporated by reference herein.

BACKGROUND AND SUMMARY OF THE INVENTION

The present invention concerns a motor vehicle seat with a seat cushion mounted on a seat frame, a backrest, and a fixing bracket for detachable fastening of an object placed on the seat cushion which is configured such that the fixing bracket can be swiveled from a covered out-of-use position into a functioning position in which the fixing bracket protrudes accessibly between the seat cushion and the backrest.

Such a motor vehicle seat is known from German document DE 196 50 087 C1. This document shows a device for detachable fastening of a child's seat in a motor vehicle seat with folding backrest. The device is rigidly connected with the bearing structure of the motor vehicle seat and arranged so that it is not disturbing in its resting position. The device has two mountings for a child's seat that are connected with the frame of the motor vehicle seat through a swivel axis. The mountings are brought out of their resting position into their functioning position when the backrest of the motor vehicle seat is folded forward and the mountings are swiveled into their functioning position. After swiveling the fixing bracket forward, the backrest is raised again. The disadvantage with this known device is the complicated serviceability of the mountings and the unavoidable folding of the backrest for swiveling the mountings from a resting position into a functioning position and back.

German document DE 101 60 236 C1 illustrates a child's seat which is suited for installation on a motor vehicle seat with such a mounting.

One object of this invention is the object of creating a motor vehicle seat with a mounting device which does not disturb objects placed on the motor vehicle seat when in the out-of-use position and which can be brought into the functioning position simply. Preferably, the holding device is constructed structurally simply, is comfortably operable, and offers a mechanically stable restraining point.

This object is accomplished by a motor vehicle seat having a swiveling device which has a four arm linkage that locks the fixing bracket in the functioning position, and with a fixing bracket which is U-shaped and connected fast with a shaft pivoted on the seat frame.

The motor vehicle seat of the invention has a swiveling device which swivels one or more, and preferably two, fixing brackets out of a concealed, out of use position into a functioning position. This swiveling device has a four bar linkage that locks the fixing bracket or brackets in a functioning position. This is advantageous in that the retaining device is not visible when not in use and is concealed and locked mechanically stably in the functioning position when in use. The four bar linkage or the fixing bracket is connected with a supporting element of the seat structure, preferably the seat frame, and can thus absorb large forces and pass them on to the support structure of the motor vehicle seat. Preferably, the four bar linkage is self-locking so that the four bar linkage automatically locks and mechanically secures the fixing bracket. This has an advantage in that, in the functioning position, the fixing bracket is, in any case, mounted firmly and mechanically stably.

When the fixing bracket is not in use, the swiveling device swivels the fixing bracket from the functioning position back into the out of use position. The four bar linkage can therefore be collapsed or folded together, and consequently requires as little structural space as possible.

In one construction, the four arm linkage has two levers connected rotatably with each other. These two levers form centers of rotation of the four arm linkage, since the two levers are connected rotatably with each other and since the first lever is rotatably connected with the fixing bracket and the second lever is rotatably connected with the supporting structure of the motor vehicle seat, preferably with a seat frame. The fixing bracket is connected so that it is capable of swiveling with the supporting structure of the motor vehicle seat whereby the shaft forms the fourth linkage of the four arm linkage.

The four arm linkage is especially arranged such that it occupies as little space as possible in the out of use position and forms a triangle of forces in the functioning position that accommodates the forces introduced into the fixing bracket from the object (for example, a child's seat) placed on the seat cushion, or passes them on to the supporting structure of the motor vehicle seat.

The two levers of the four arm linkage are arranged such that they are arranged at angles, preferably lying one on the other, in the out of use position. In this way, the levers lie close to each other, preferably beside each other, and occupy little space. In the functioning position of the fixing bracket, the two levers form a straight line and are consequently fitted to absorb tractive (tensile) and compressive forces along this line and to forward them to the supporting structure of the motor vehicle seat.

In one construction, the swiveling device has a Bowden cable that swivels the fixing bracket from the out of use position into the functioning position and holds it there. The four arm linkage locks the fixing bracket in the functioning position and therewith releases the Bowden cable. Forces introduced from an object such as a child's seat placed upon the seat cushion into the motor vehicle seat structure can become very high in the event of a crash. Since a Bowden cable can transmit high tractive forces but only small compressive forces, it is necessary for the Bowden cable to be mechanically released in the functioning position so as to be able to pass on the high forces arising during a crash securely into the motor vehicle structure and to be able to absorb the forces. The four arm linkage (which automatically locks in the functioning position) takes over this task and thereby passes on these forces into the seat structure.

The swiveling device has an energy storage unit, preferably a spring storage unit with mechanical or gas springs, that is charged when the fixing bracket is swung into the functioning position. The energy storage unit is constructed such that it automatically swings the fixing bracket back into the out-of-use position when discharged. Consequently, a secure and comfortable swinging back of the fixing bracket into the out-of-use position is guaranteed after locking of the fixing bracket is released. The energy storage unit can have a spring that acts upon the fixing bracket toward the out-of-use position.

One construction provides that the Bowden cable swings the fixing bracket from the out-of-use position into the functioning position against the restoring force of the energy storage unit. Advantageously the Bowden cable is arranged such that it is stressed under tension when the fixing bracket is swung into functioning position. The Bowden cable is capable of transmitting the tractive forces without difficulty, and moreover can charge the energy storage unit with the swinging motion.

In one construction, the Bowden cable is connected with the fixing bracket through the four arm linkage. In particular, the Bowden cable can be connected with the fixing bracket through the first lever, the second lever, or the four arm linkage. The Bowden cable can be manually or automatically actuated and, in particular, can be connected with an automatic motor for automatic activation of the fixing bracket.

In one construction, the Bowden cable is connected with a seat adjusting apparatus, for example a height adjusting apparatus and/or an inclination adjusting apparatus. In this way, the fixing bracket can be automatically swung in a preselectable seating position into the functional position, or only be swivelable into the functioning position in a preselectable seating position. This makes it possible for the motor vehicle seat to be in as secure as possible a seating position, preferably upright, for setting up a child's seat or a container.

The motor vehicle seat of the invention is especially suited for fastening children's seats with a so-called "isofix" fastening system, with two fixing brackets. The motor vehicle seat of the invention can be used in street motor vehicles, such as, for example, passenger cars or busses. Likewise use of the motor vehicle seat in rail motor vehicles in conceivable.

BRIEF DESCRIPTION OF THE DRAWINGS

Further features and embodiments of the invention are described in greater detail in the following figures.

DETAILED DESCRIPTION OF THE INVENTION

Figure 1:
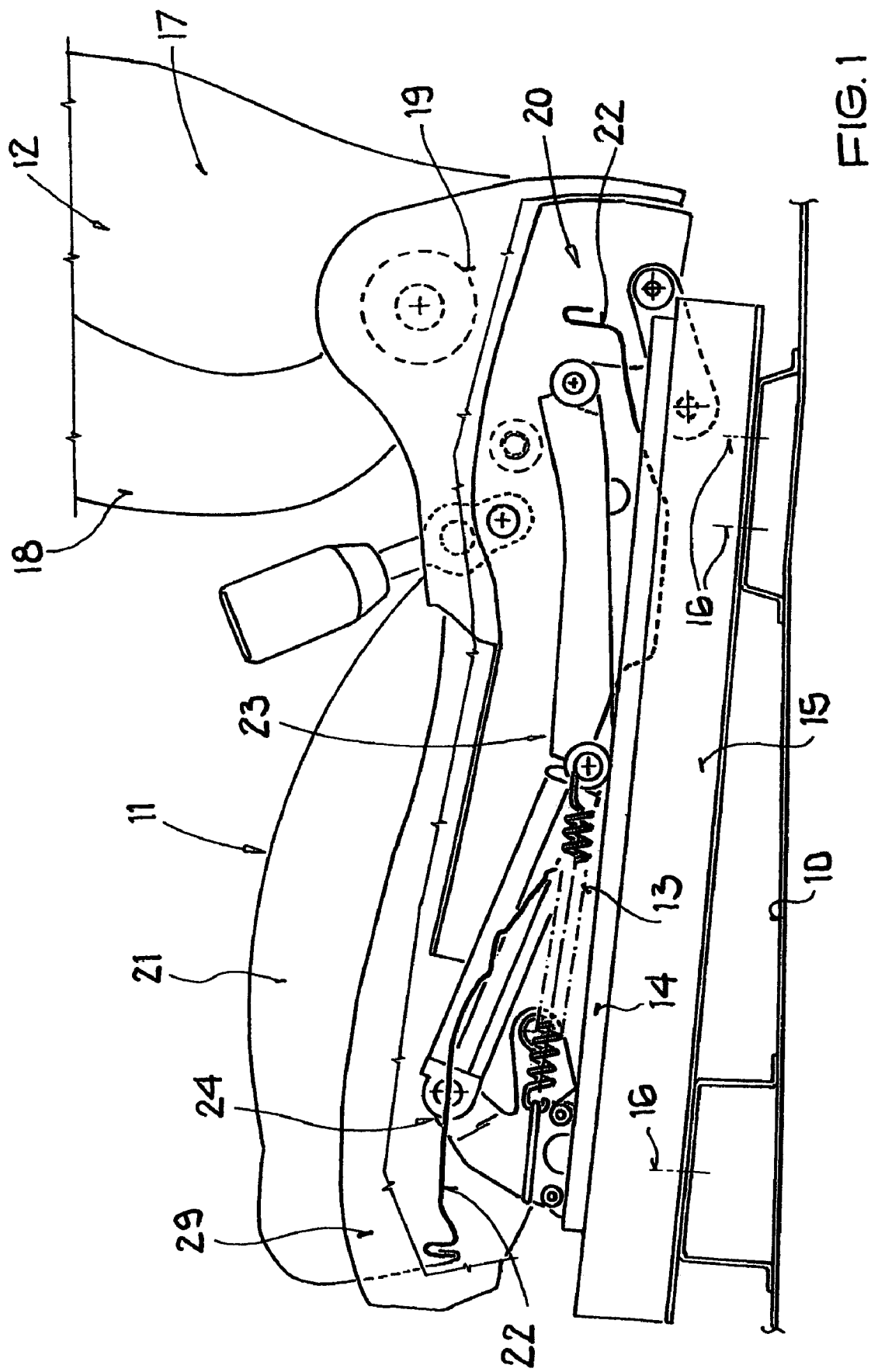
FIG. 1 is a cutaway side view of a passenger seat for a passenger car.

A motor vehicle seat of the invention is represented in side view in FIG. 1. The motor vehicle seat has a seat chassis 13 longitudinally displaceably fastened on a motor vehicle floor 10. Two parallel sliding rails 14 are arranged on the seat chassis 13 and are mounted in guide rails 15 for longitudinal displacement of the motor vehicle seat. The guide rails 15 are connected fast with the motor vehicle floor 10 through fastening screws 16.

The seat chassis 13 includes a seat cushion 11 and a backrest 12. The backrest 12 has a backrest chassis 17 and backrest padding 18 retained in the backrest chassis 17. The backrest 12 is connected with the seat chassis 13 through a seat back fitting 19. The seat back fitting 19 has a horizontal swinging axis through which the inclination of the backrest in relation to the seat cushion 11 can be adjusted.

A seat frame 20 is mounted in the seat chassis 13 such that it is adjustable as to height and in inclination in relation to the motor vehicle floor 10. The seat frame 20 mounts the seat cushion 11 as well as seat padding 21 that is spread on a cushion shell 22. The cushion shell 22 is mounted so as to be longitudinally displaceable within limits in the seat frame for adjusting the seat depth. The inclination of the seat cushion 11 can be adjusted through an inclination angle device 24 in relation to the seat chassis 13. Adjustment of the seat position, in particular the inclination of the backrest, the inclination of the seat cushion, and the seat depth, as well as the height adjustment of the seat cushion through a height adjustment device 23, takes place through electric motors, and preferably is remotely operable. Nonetheless, the electric motors and the associated transmissions for transmitting the positioning force on the corresponding parts of the motor vehicle seats are not represented for reasons of better clarity.

The motor vehicle seat has a frame diaphragm 29 that optically covers and mechanically protects the seat frame 20 and the adjustment and inclination angle devices 23, 24.

The motor vehicle seat is outfitted with two fixing brackets 30 for fastening a child's seat onto the motor vehicle seat which respectively interact with a stop device arranged on the child's seat.

Figure 2:
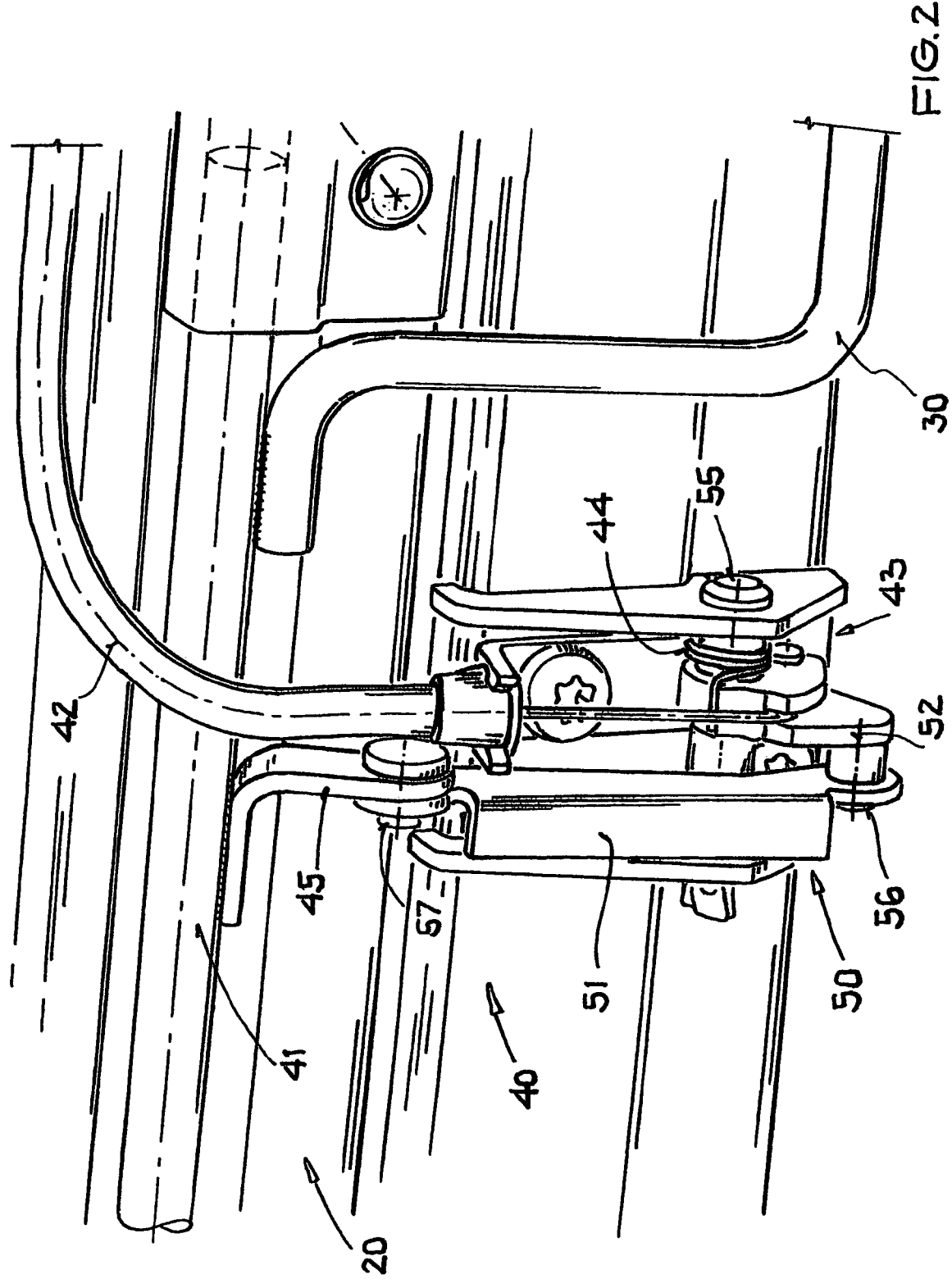
FIG. 2 is a view of a swiveling device with a four arm linkage fastened in the seat frame.
Figure 3:
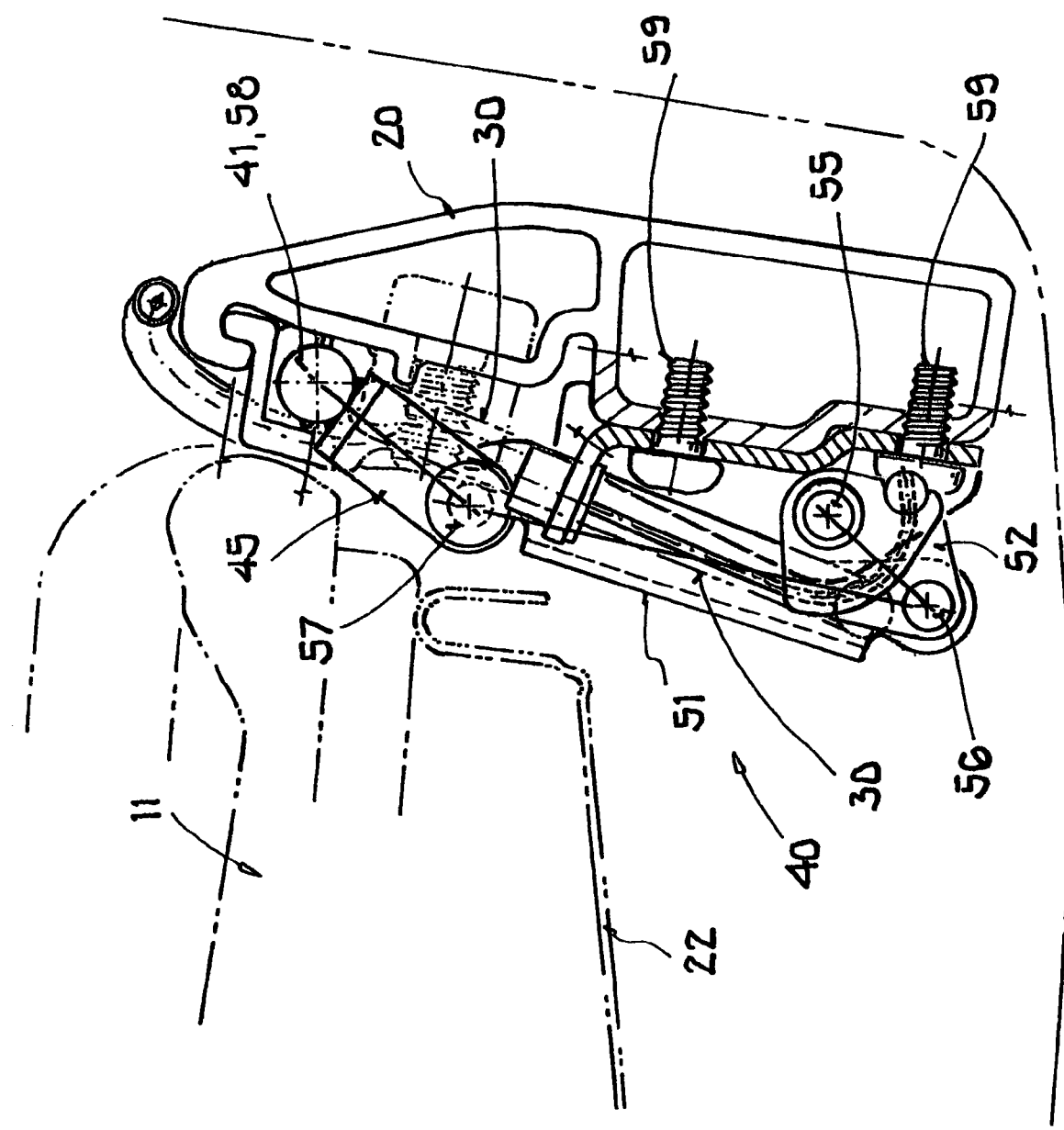
FIG. 3 is a side sectional view of the four arm linkage in the out-of-use position.
Figure 4:
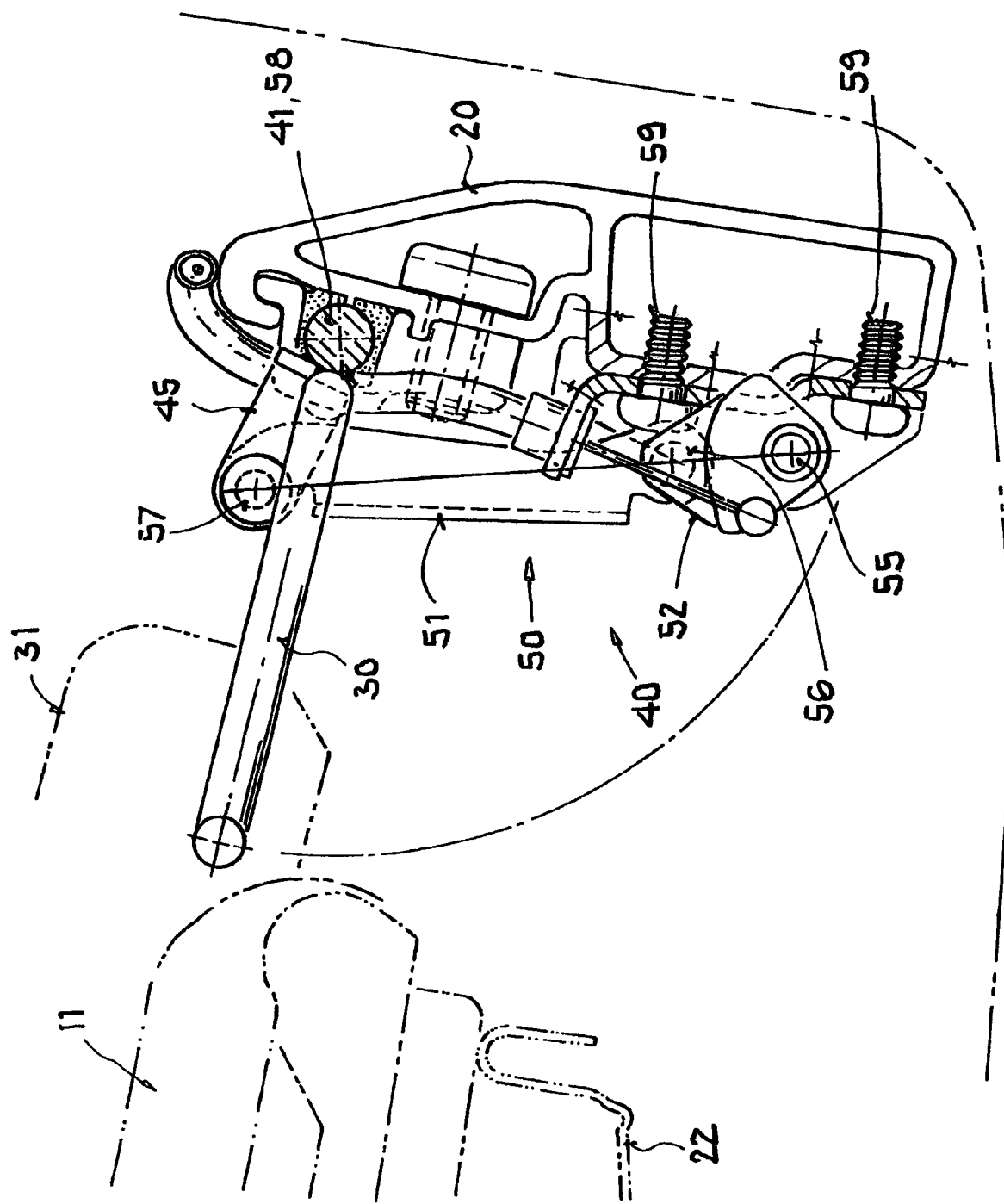
FIG. 4 is a side sectional view of the four arm linkage in a functioning position.

For better clarity, only one fixing bracket 30 is represented in each of FIGS. 2, 3 and 4.

In order that the fixing brackets 30 do not impair seating comport when the child's seat is removed from the motor vehicle seat, that is, during normal seat use, the fixing brackets 30 are swiveled into an out-of-use position when the child's seat is dismounted. In the out-of-use position, the fixing brackets are concealed behind the seat padding 21 and beneath the backrest 12, and are covered and protected by the seat padding 21 and the back rest padding 18. In this way, the fixing brackets are concealed in the out-of-use position and well padded so that they do not increase the danger of injury for someone sitting in the motor vehicle seat even in the event of a crash.

The two fixing brackets 30 are constructed so as to be U-shaped and are connected fast with a shaft 41 pivoted on the seat frame 20. The two fixing brackets are arranged on the pivoted shaft so as to correspond in distance with the stop devices 31 of the child's seat. The swiveling device 40 arranged on the seat frame 20 is represented in FIG. 2. The swiveling device 40 includes the shaft 41 that mounts the fixing bracket 30, the Bowden cable 42 as well as the four arm linkage 50.

The swiveling device 40, enlarged in the representation of FIG. 2, includes the Bowden cable 42, an energy storage unit 43, and an eccentric 45. The eccentric is connected, on one end, fast with the pivoted shafts 41, and, on the other end, is rotably connected with the four arm linkage. The Bowden cable 42 has a protective jacket and a force-transmitting core and is connected at one end with an electric motor for actuation of the swiveling device. The other end of the Bowden cable is connected with the four arm linkage. The energy storage unit 43 of the swiveling device has a spring 44 that engages between the stationary swiveling device and the pivoted four arm linkage and acts upon the four arm linkage in the out-of-use position direction. The four arm linkage has a first lever 51 and a second lever 52. The end of the first lever 51 facing away from the point or center of rotation 56 is connected with the eccentric 45 and therewith with the swingable shaft 41 through the center of rotation 57. The end of the second lever 52 facing away from the point of rotation 56 is rotably connected with the stationary swiveling device 40 and therewith with the seat frame 20 through point of rotation 55. The spring 44 is constructed as a coiled spring and is arranged at the point of rotation 55. The spring 44 acts upon the second lever 52 in the direction of the out-of-use position. The core of the Bowden cable 42 is connected with the second lever 52 of the four arm linkage.

The region around the swiveling device 40 is represented, in an enlarged detailed sectional representation, in FIG. 3. FIG. 3 illustrates the out-of-use position of the fixing bracket 30. The swiveling device 40 and the fixing bracket or brackets 30 are arranged between the seat cushion. The seat cushion 11 cushions the mechanism of the swiveling device 40 and covers the latter. The swiveling device 40 and the four arm linkage 50 with the first lever 51 and the second lever 52 are arranged in the represented out-of-use position such that they occupy as little space as possible. For this, the first lever 51 is arranged at an angle toward the second lever 52. The eccentric 45, which connects the first lever with the swingable shaft 41, is likewise arranged at an angle toward the first lever 51. The eccentric 45 runs approximately parallel to the second lever 52 so that the connection lines of the centers of rotation of the four arm linkage, as there are the point of rotation 58 formed by the swingable shaft 41, the point of rotation 57 that connects the first lever 51 with the second lever 52, and the point of rotation 55 that connects the second lever 52 with the seat frame, represent a narrow parallelogram. The fixing bracket or brackets 30 lie in alignment with this parallelogram. This parallelogram is narrowly arranged on the seat frame 20 and thus accommodated in a space-saving manner. The parallelogram is indicated by the connection lines of points of rotation 55, 56, 57, 58. The swiveling device 40 is fastened on the seat frame 20 through screws 59.

The seat cushion 11 is removed from the swing track of the fixing bracket to swivel the fixing bracket out of the out-of-use position represented in FIG. 3 into the use position represented in FIG. 4. For this, the cushion or seat shell 22, with the seat cushion 11 arranged upon it, and the seat padding 21 are moved forward in the longitudinal direction of the seat so that the fixing bracket 30 or fixing brackets 30 can swing past the rear edge of the seat padding as represented in FIG. 4. After unfolding the fixing bracket into its functioning position, the seat cushion 11 can electively be left in its slid forward position or put back into a position more toward the backrest.

FIG. 4 represents the two levers 51 and 52 of the four arm linkage as forming a straight line in the functioning position of the fixing bracket 30. The points of rotation 55, 56 and 57, moreover, lie on a common connecting straight line that is indicated in FIG. 4.

The connecting lines of points of rotation 55, 56, 57, and 58 form a triangle in the functioning position of the bracket or brackets 30. This triangle is in a position to absorb forces that are introduced into the fixing bracket 30 by, for example, a child's seat through the mounting 31 connected with the fixing bracket 30 and to pass them on to the supporting seat structure with the seat frame 20. The forces introduced into the fixing bracket 30 are resolved according to the triangle of forces formed by the four arm linkage, and their components are passed through the transmission lines of this force triangle to the seat frame 20. Levers 51 and 52 that stand in a straight line moreover lock the fixing bracket 30, since only tractive or compressive forces can be transmitted along this connecting line of the two levers, and the two levers accommodate these forces without being able to break out. The Bowden cable 42 is connected with the second lever 52 and acts upon this in the functioning position represented in FIG. 4 in the direction of traction of the Bowden cable against the force of the spring 44. It is therewith positioned mechanically stable and statically fixed.

To transfer the fixing bracket 30 from the functioning position into the out-of-use position, the child's seat is first of all detached from the seat surface. Then the seat cushion is brought into its front position as represented in FIG. 4. After loosening the Bowden cable 42, the spring 44 of the energy storage unit 43 can swing the second lever 52 of the four arm linkage counterclockwise. In this way, the two levers 51 and 52 of the four arm linkage 50 are brought from their straight position in relation to each other into the position arranged at an angle toward each other, as represented in FIG. 3. Moreover, the fixing brackets 30 are brought back into the out-of-use position along the circular segment represented in FIG. 4 through the eccentric 45 connected fast with the swingable shaft 41. Subsequently, the seat cushion is pushed back into the longitudinal direction of the motor vehicle seat until the seat cushion 11 or the seat padding covers the slot between the seat cushion 11 and the backrest 12 or the swiveling device 40 and the seat frame 20. The normal function of the seat is restored again after reaching the out-of-use position.

The described sequence of swiveling the fixing bracket out of the out-of-use position into the functioning position and back can take place manually or through an automatic sequence control that can be connected with a so-called seat memory. The automatic sequence control ensures that, after selecting the child's seat position, the seat cushion is automatically moved from the swivel region of the fixing bracket and actuated corresponding to the Bowden cable 42 so that the fixing brackets swivel into their functioning position. When selecting the out-of-use position, the sequence control unit controls the sequences of motion accordingly in reverse so that the fixing brackets swivel completely automatically from the functioning position into the out-of-use position. A comfortable sequence of seat adjustment is therewith guaranteed and, at the same time, a secure mounting of the child's seat is guaranteed through the fixing bracket 30 connected with the seat frame 20 through the upset.

The invention not restricted to the embodiments described. Thus, another form of actuation can be provided instead of the Bowden cable. For example, a chain or a strut, or an electric, pneumatic, or hydraulic device, can be used. The remaining seat adjustment devices can also selectively take place electrically, pneumatically or hydraulically.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A motor vehicle seat comprising:
 a seat cushion mounted on a seat frame,
 a backrest,
 a fixing bracket for detachable fastening of an object placed on the seat cushion, and
 a swiveling device arranged on the seat frame and having a four arm linkage,
 wherein the fixing bracket can be swiveled from a covered out-of-use position into a functioning position in which the fixing bracket protrudes accessibly between the seat cushion and the backrest,
 wherein the four arm linkage locks the fixing bracket in the functioning position, and
 wherein the fixing bracket is U-shaped and is connected fast with a shaft pivoted on the seat frame.

2. The motor vehicle seat according to claim 1, wherein the four arm linkage has two levers connected rotatably with each other, wherein the first lever is rotatably connected with the fixing bracket, and wherein the second lever is rotatably connected with the seat frame.

3. The motor vehicle seat according to claim 2, wherein the first and second levers are arranged such that they are arranged at an angle toward each other and form a straight line for retaining the fixing bracket in the functioning position.

4. The motor vehicle seat according to claim 3, wherein the fixing bracket is pivoted and the shaft forms a joint of the four arm linkage.

5. The motor vehicle seat according to claim 3, wherein the swiveling device has a Bowden cable that swivels the fixing bracket from the out-of-use position into the functioning position and holds it there.

6. The motor vehicle according to claim 3, wherein the swiveling device has an energy storage unit which is charged when the fixing bracket is swung into the functioning position and automatically swings back from the functioning position into the out-of-use position when the fixing bracket is released.

7. The motor vehicle seat according to claim 3, wherein the Bowden cable is connected with the fixing bracket through the four arm linkage, and wherein the four arm linkage absorbs forces introduced into the fixing bracket by the object and thus relieves the Bowden cable.

8. The motor vehicle seat according to claim 2, wherein the fixing bracket is pivoted and the shaft forms a joint of the four arm linkage.

9. The motor vehicle seat according to claim 2, wherein the swiveling device has a Bowden cable that swivels the fixing bracket from the out-of-use position into the functioning position and holds it there.

10. The motor vehicle according to claim 2, wherein the swiveling device has an energy storage unit which is charged when the fixing bracket is swung into the functioning position and automatically swings back from the functioning position into the out-of-use position when the fixing bracket is released.

11. The motor vehicle seat according to claim 2, wherein the Bowden cable is connected with the fixing bracket through the four arm linkage, and wherein the four arm linkage absorbs forces introduced into the fixing bracket by the object and thus relieves the Bowden cable.

12. The motor vehicle seat according to claim 1, wherein the fixing bracket is pivoted and the shaft forms a joint of the four arm linkage.

13. The motor vehicle seat according to claim 12, wherein the swiveling device has a Bowden cable that swivels the fixing bracket from the out-of-use position into the functioning position and holds it there.

14. The motor vehicle according to claim 12, wherein the swiveling device has an energy storage unit which is charged when the fixing bracket is swung into the functioning position and automatically swings back from the functioning position into the out-of-use position when the fixing bracket is released.

15. The motor vehicle seat according to claim 12, wherein the Bowden cable is connected with the fixing bracket through the four arm linkage, and wherein the four arm linkage absorbs forces introduced into the fixing bracket by the object and thus relieves the Bowden cable.

16. The motor vehicle seat according to claim 1, wherein the swiveling device has a Bowden cable that swivels the fixing bracket from the out-of-use position into the functioning position and holds it there.

17. The motor vehicle according to claim 16, wherein the swiveling device has an energy storage unit which is charged when the fixing bracket is swung into the functioning position and automatically swings back from the functioning position into the out-of-use position when the fixing bracket is released.

18. The motor vehicle seat according to claim 17, wherein the energy storage unit has a spring that acts upon the fixing bracket in the out-of-use position.

19. The motor vehicle seat according to claim 18, wherein the Bowden cable holds the fixing bracket against the restoring force of the spring in the functioning position.

20. The motor vehicle seat according to claim 18, wherein the Bowden cable is connected with the fixing bracket through the four arm linkage, and wherein the four arm linkage absorbs forces introduced into the fixing bracket by the object and thus relieves the Bowden cable.

21. The motor vehicle seat according to claim 17, wherein the Bowden cable holds the fixing bracket against the restoring force of the energy storage unit in the functioning position.

22. The motor vehicle seat according to claim 8, wherein the Bowden cable is connected with the fixing bracket through the four arm linkage, and wherein the four arm linkage absorbs forces introduced into the fixing bracket by the object and thus relieves the Bowden cable.

23. The motor vehicle seat according to claim 17, wherein the Bowden cable is connected with the fixing bracket through the four arm linkage, and wherein the four arm linkage absorbs forces introduced into the fixing bracket by the object and thus relieves the Bowden cable.

24. The motor vehicle seat according to claim 16, wherein the Bowden cable is connected with the fixing bracket through the four arm linkage, and wherein the four arm linkage absorbs forces introduced into the fixing bracket by the object and thus relieves the Bowden cable.

25. The motor vehicle seat according to claim 1, wherein the Bowden cable is connected with the fixing bracket through the four arm linkage, and wherein the four arm linkage absorbs forces introduced into the fixing bracket by the object and thus relieves the Bowden cable.

26. The motor vehicle seat according to claim 1, wherein the Bowden cable is connected with an electric motor for automatic activation of the fixing bracket.

27. The motor vehicle seat according to claim 1, wherein the Bowden cable is connected with a seat adjusting apparatus such that the fixing bracket can only be swung in a preselectable seat position into the functioning position.

28. The motor vehicle seat according to claim 1, wherein the object is a child's seat.

29. The motor vehicle according to claim 1, wherein the swiveling device has an energy storage unit which is charged when the fixing bracket is swung into the functioning position and automatically swings back from the functioning position into the out-of-use position when the fixing bracket is released.

* * * * *